United States Patent
Lockery

[11] Patent Number: 6,147,312
[45] Date of Patent: Nov. 14, 2000

[54] STRAIN GAGE BRIDGE CIRCUIT WITH SENSITIVITY EQUALIZATION AND METHOD FOR SENSITIVITY EQUALIZATION

[75] Inventor: Harry E. Lockery, Sudbury, Mass.

[73] Assignee: Flintec Inc., Hudson, Mass.

[21] Appl. No.: 09/166,113

[22] Filed: Oct. 5, 1998

[51] Int. Cl.[7] ............................. G01G 3/14; G01G 19/56; G01L 1/22
[52] U.S. Cl. ...................... 177/211; 73/1.15; 73/862.474
[58] Field of Search ................ 177/211, 50; 73/862.474, 73/862.627, 862.628, 1.11, 1.13, 1.15

[56] References Cited

U.S. PATENT DOCUMENTS

| | | | |
|---|---|---|---|
| Re. 32,631 | 3/1988 | Layer | 177/211 |
| 3,576,128 | 4/1971 | Lockery | 73/1.15 |
| 3,899,924 | 8/1975 | Klein | 73/1.15 |
| 4,061,198 | 12/1977 | Caldicott | 177/50 |
| 4,958,526 | 9/1990 | Haggstrom | 73/862.627 |
| 4,979,580 | 12/1990 | Lockery | 177/211 |
| 5,610,343 | 3/1997 | Eger et al. | 73/862.628 |

OTHER PUBLICATIONS

Hudson et al. "University Physics", Harcourt Brace Jovanovich, Inc. New York, N.Y., p. 602, 1982.

*Primary Examiner*—Randy W. Gibson

[57] ABSTRACT

A strain gage bridge circuit and method for sensitivity equalization, particularly suitable for load cell devices for precision measurement. The sensitivity of opposing half-bridges in a strain gage bridge circuit is equalized by a pair of equal, fixed resistors connected across a bridge diagonal formed by the two half-bridges, and a third resistor connecting the junction of the two equal, fixed resistors to the center of the half-bridge with the highest sensitivity. The effective shunting of the most sensitive half bridge can be changed by changing the value of the third resistor, while the ratio of the two equivalent shunting resistance values remain exactly constant. The total load on the bridge diagonal also remains constant when the value of the third resistor is changed. Both sets of orthogonally arranged opposed half-bridges in a strain gage bridge circuit can be equalized independently when two sets of equalizing resistors are used.

6 Claims, 2 Drawing Sheets

STRAIN GAGE BRIDGE CIRCUIT WITH SENSITIVITY EQUALIZATION AND METHOD FOR SENSITIVITY EQUALIZATION

BACKGROUND OF THE INVENTION

The present invention is directed to a strain gage bridge circuit with sensitivity equalization and method for sensitivity equalization that are improvements over an invention disclosed in U.S. Pat. No. 4,979,580, issued Dec. 25, 1990 to Lockery, the contents of which patent are incorporated herein by reference.

U.S. Pat. No. 4,979,580 to Lockery discloses how to equalize the measuring sensitivity of opposing half-bridges in a strain gage bridge circuit by connecting pairs of shunt resistors of equal resistance cross a pair of bridge arms forming one half-bridge, and describes how this equalization method can be used to eliminate the sensitivity to variations in the location of the point of force application in a planar weighing device with four strain gages. Changes in the shunt resistance affects the sensitivity of one side of the load platform only, and does not affect the zero adjustment of the bridge output signal. The sensitivity adjustment method described in U.S. Pat. No. 4,979,580 to Lockery works well, and it has been used extensively. Sensitivity adjustment is usually done by trial and error, with resistor decade boxes used as shunt resistors. The resistor boxes are replaced with soldered-in combinations of fixed resistors before the load cell is shipped. Accurate replacement of the resistor box values, however, is a rather demanding and time consuming procedure, especially since the two resistors in a pair must always remain exactly equal. The shunt resistor values also affect the adjustments for linearity and temperature compensation in the strain gage bridge circuit.

SUMMARY OF THE INVENTION

A main object of the present invention is to provide an inexpensive strain gage bridge circuit with equalization of the relative sensitivity of opposing half-bridges in the strain gage bridge circuit.

A further object of the present invention is to provide a method for adjusting the relative sensitivity of opposing half bridges in a strain gage bridge circuit that is easier and less time consuming to perform than previously known methods.

A still further object of the present invention is to provide a sensitivity equalization method that is particularly suitable for load cell devices and that is as effective and accurate as the method described in U.S. Pat. No. 4,979,580, but which does not cause any interaction between the sensitivity adjustment and the adjustments for linearity or temperature compensation in a load cell device utilizing a strain gage bridge circuit according to the invention.

A strain gage bridge circuit, according to a preferred embodiment of the present invention, comprises four arms including strain gages to form two pairs of opposing half bridges arranged symmetrically with respect to two bridge diagonals, first and second resistors connected in series across a first diagonal of the bridge circuit, and a third resistor connected between one end of a second bridge diagonal and the junction point of the series connected first and second resistors.

A method, according to a preferred embodiment of the invention, for sensitivity equalization of opposing half-bridges in a strain gage bridge circuit having four arms forming a first and a second bridge diagonal and pairs of half-bridges arranged symmetrically about each of the first and second bridge diagonal comprises the steps of connecting a pair of substantially equal resistors in series across a first diagonal in the bridge circuit, determining which of the two half-bridges arranged symmetrically about the first bridge diagonal has the highest sensitivity, connecting a third resistor between the junction point of the series-connected resistors and an end point of the second diagonal forming a center tap on the half-bridge having the highest sensitivity, and adjusting the resistance of the third resistor to equalize the sensitivity of the two half bridges about the first bridge diagonal.

BRIEF DESCRIPTION OF THE DRAWINGS

The accompanying drawings, which are incorporated in and constitute a part of the specification, illustrate a preferred embodiment of the invention and, together with the description, serve to explain the principles of the invention.

DETAILED DESCRIPTION OF PREFERRED EMBODIMENTS

Reference will now be made in detail to a preferred embodiment of the invention, examples of which are illustrated in the accompanying drawings.

Figure 1:
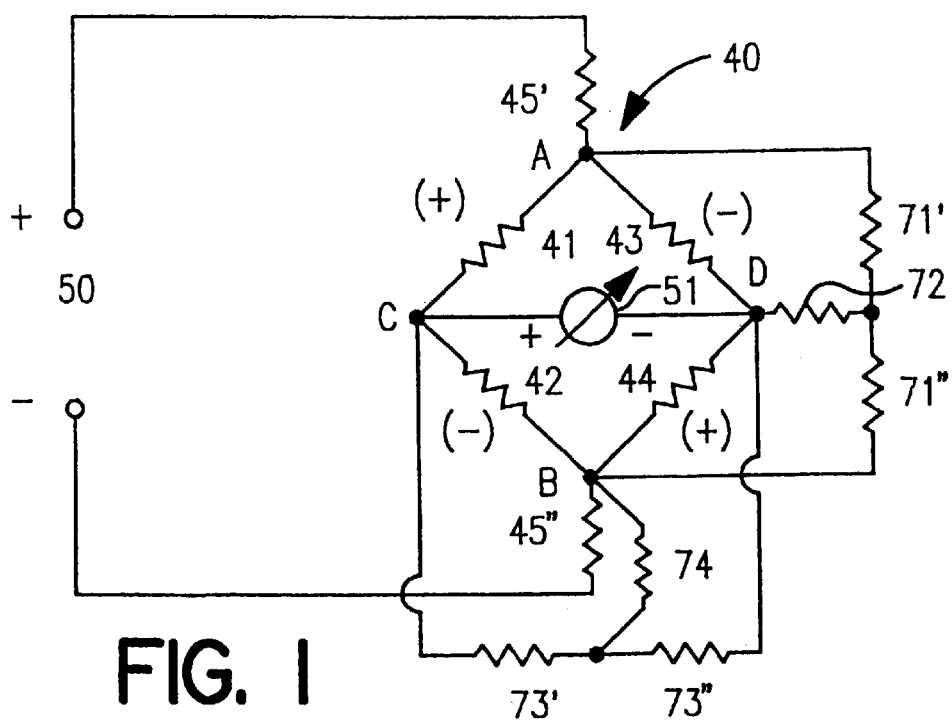
FIG. 1 is a schematic diagram of a strain gage bridge circuit, according to a preferred embodiment of the present invention, with two sets of three equalization resistors.

According to the preferred embodiment of the invention, FIG. 1 shows a strain gage bridge circuit with a strain gage bridge 40 having four arms 41, 42, 43, 44, each including at least one strain gage. One diagonal, with end points A-B, is connected to a power supply source 50 in series with resistor device 45', 45" serving to compensate for temperature variations and non-linearity in the strain gage bridge 40, as is known in the art. The second diagonal, with end points C-D, provides an output signal representing the sum of the signals generated by the strain gage device in the four arms 41, 42, 43, 44, and is connected to an indicator 51.

In many load cell applications, opposing half-bridges, 41-42 and 43-44, or 41-43 and 42-44, will have different sensitivities to an applied load, e.g. as described in U.S. Pat. No. 4,979,580 to Lockery, which is included herein by reference. According to the preferred embodiment of the present invention, resistor networks 71', 71", 72 connected to bridge terminals A, B, D, and 73', 73", 74 connected to bridge terminals C, D, B, are added to the basic strain gage bridge 40 as shown in FIG. 1 for the purpose of equalizing such sensitivity differences. First and second resistors 71' and 71", which have substantially equal resistance values, are connected in series across bridge diagonal A-B, and a third resistor 72 is connected between the junction point between the series connected first and second resistors 71', 71" and junction point D between bridge arms 43, 44. In the same way, fourth and fifth resistors 73', 73", which also have substantially equal resistance values, are connected in series across bridge diagonal C-D, and a sixth resistor 74 is connected between the junction point between the series connected resistors 73', 73" and junction point B between bridge arms 42, 44.

Figure 2:
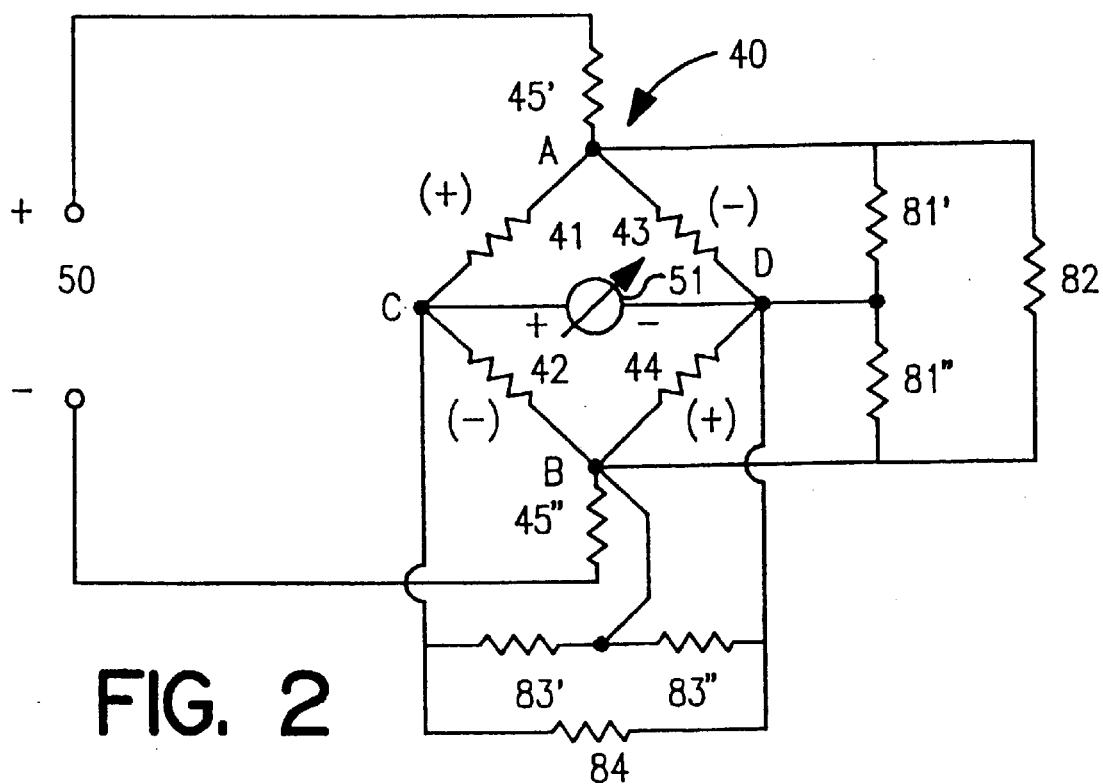
FIG. 2 is a schematic diagram of the same strain gage bridge circuit as in FIG. 1, after a Y–Δ transformation of the three-resistor network in each set of equalization resistors.

How the two resistor networks 71', 71", 72 and 73', 73", 74 can be used to change the sensitivity of the associated half-bridges will be best understood by reference to FIG. 2, which shows the same circuit as FIG. 1, except that the two Y-connected resistor networks 71', 71", 72 and 73', 72", 74 have been transformed to their equivalent Δ-configurations.

It is known to those skilled in the art that any impedance network with three terminals can be represented by either a Y or a Δ configuration of three impedances, and it makes no difference to external circuits which of the two representations is selected. Textbooks on electrical circuits give the following formulae for the transformation of resistance values from a Y configuration, such as 71', 71", 72 in FIG. 1 to an equivalent Δ configuration, such as 81', 81", 82 in FIG. 2:

$$R81'=(R71'*R71''+R71'*R72+R71''*R72)/R71'' \quad (1)$$

or:

$$R81'=R71'+R72(1+R71'/R71'') \quad (1a)$$

$$R81''=((R71'*R71''+R71'*R72+R71''*R72)/R71' \quad (2)$$

or:

$$R81''=R71''+R72(1+R71''/R71') \quad (2a)$$

$$R82=(R71'*R71''+R71'*R72+R71''*R72)/R72 \quad (3)$$

If one sets R71'=R71"=R71, then:

$$R81''=R71+2R72 \quad (1b)$$

$$R81'=R71+2R72 \quad (2b)$$

$$R82=R71(2+R71/R72) \quad (3b)$$

Transformation of resistance values 73', 73", 74 in the second Y resistor network to an equivalent Δ resistor network 83', 83", 84 follows the same formulae, with 73, 74 replacing 71, 72 and 83, 84 replacing 81, 82.

Figure 3:
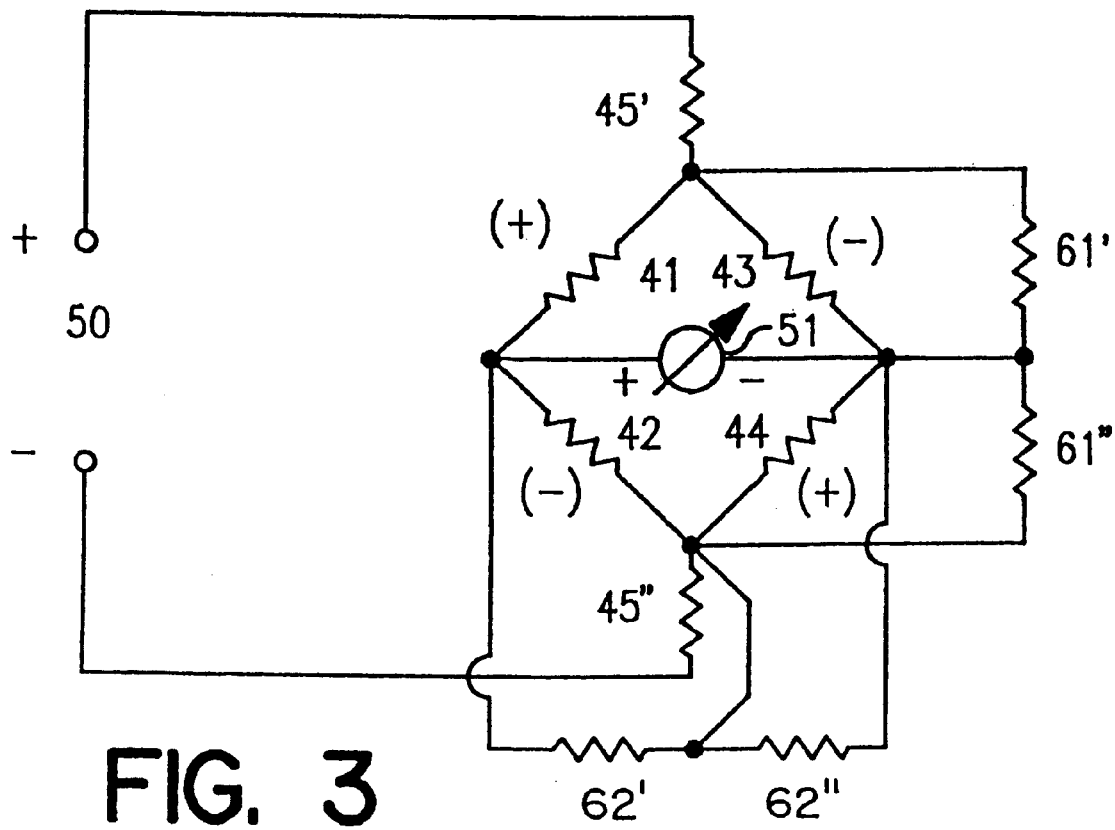
FIG. 3 is a schematic diagram of a known strain gage bridge circuit with equalization resistors for two half-bridges as described in U.S. Pat. No. 4,979,580 to Lockery.

FIG. 3 shows the bridge connection and equalizing resistors for the force measuring device described in U.S. Pat. No. 4,979,580. Resistors 81' and 81" in FIG. 2 affect the sensitivity of half bridge 43, 44 in a similar way as resistors 61', 61" affect the sensitivity of half bridge 43, 44 in FIG. 3.

Considering that FIGS. 1 and 2 are equivalent, with equations (1b)–(3b) determining the relationships between the resistors 81', 81", 82 and resistors 71', 71", 72, it will be understood that it is possible to vary the effective shunting of bridge arms 43 and 44 by varying a single resistor 72 in the arrangement shown in FIG.1. The third resistor 82 in FIG. 2 does not affect the sensitivity of any bridge arms, but simply acts as a load on the bridge diagonal A-B, Resistor network 73', 73", 74 affects half bridge 42, 44 exactly the same way as resistor network 71', 71", 72 affects the half bridge 43, 44. The conversion formulae are the same, only with 73 replacing 71, 74 replacing 72, 83 replacing 81, and 84 replacing 82 everywhere.

Formulae (1b)–(3b) show that the effective shunt resistance values R81'=R81"=R81 can be varied in the range R71≦R81≦∞ by changing R72 from 0 to ∞. R71' and R71" can thus be pre-selected fixed resistors having resistance values low enough to permit maximum anticipated change in sensitivity for a half bridge while the actual adjustment is made by one single resistor 72. The effective shunt resistance values 81' and 81" will always remain equal, independent of the resistance value R72. This makes it possible to use a potentiometer for R72 instead of resistor decade boxes, so the equalization process will be much simpler and less time consuming than equalization by the method described in U.S. Pat. No. 4,979,580.

In practice, equalization according to a preferred embodiment of the invention is done as follows:

First, a pair of fixed resistors having equal resistance values (typically 20 kohm each for a strain gage bridge based on 350 ohm gages) are connected in series across each of the two bridge diagonals A-B and C-D. Next, the weighing or force measuring device, e.g. a load cell device, including the strain gage bridge 40 is loaded at different points of load application, and notice is made of which half bridges have the highest sensitivities. Variable resistors, e. g. potentiometers (typically 0–500 kohm), are next connected between each center point of the two series-connected resistors and the center point of each most sensitive half bridge, such as D and B in FIG. 2. A load is then moved across the weighing device, while the variable resistors are adjusted until the output signal remains constant while the load is moved. If potentiometers were used as variable resistors, they may be left in the circuit, or they can be replaced by soldered-in resistor combinations. As long as the two series-connected resistors 71' and 71" are equal, the two arms in the equalized half bridge will be guaranteed an equal amount of shunting, as shown by formulae (1b) and (2b), so the equalization will not affect the zero balance of the bridge circuit.

It can also be shown from equations (1a) and (2a) that the ratio of the effective shunt resistors 81' and 81" will remain equal to the ratio of resistors 71' and 71" even when these are not equal. This may be useful in certain cases when the two arms in a half bridge are slightly unequal, because resistors 71', 71" and/or 73', 73" can be selected to match the slight deviation from equal ratio exhibited by bridge arms 43, 44 and/or 42,44, thereby ensuring constant zero balance during the equalization process even in such a case.

The circuit shown in FIGS. 1 and 2 has another advantage over the known circuit according to FIG. 3. The resistance values R82 and R84 in FIG. 2 load the bridge diagonals A-B and C-D, and it can easily be calculated that these resistance values compensate for changes in the load from the resistors 81' and 81", respectively 83' and 83" on the bridge diagonal, so the total load on the bridge diagonals A-B and C-D remains independent of the amount of equalization. This fact can also be seen directly, without calculation, from FIG. 1. When the bridge 40 is balanced, resistors 72, 74 are each connected between points with equal potentials, so no current flows in these resistors. The total load on bridge diagonals A-B and C-D is thus determined solely by the fixed series-connected resistors 71', 71", respectively 73', 73". Only when strains in the load cell causes the resistance of bridge arms 41–44 to change so the bridge becomes unbalanced will current flow in resistors 72, 74. Resistors 72 and 74 will thus affect the sensitivity of the bridge arms, even though they do not affect the total load on the bridge diagonals. The constant load on the bridge diagonal A-B ensured by the preferred embodiment of the present invention as described makes certain that changes in equalization adjustment do not cause any change in the voltage drop in resistors 45', 45", which control temperature compensation and/or non-linearity in the strain gage device. The load across diagonal C-D is similarly constant, which ensures that changes in equalization adjustment do not change the output impedance of the bridge.

It will be evident to those skilled in the art from this description of the above preferred embodiment that only one set of sensitivity adjusting resistor network (71', 71", 72 or 73', 73", 74) will be required in those cases where only one pair of bridge arm has a sensitivity imbalance. In these cases, shunt resistors (71', 71" or 73', 73") may be connected across either diagonal A-B or diagonal C-D, as required, while the other set is left out of the circuit. Alternatively, both pairs of fixed shunt resistors (71', 71" and 73', 73") may be included as standard in the bridge circuit at all times, but one of the variable value resistors (72, 74) may be left open in some cases, as determined during calibration of the load cell.

It will also be evident to those skilled in the art from this description of the preferred embodiment that the usefulness of the present invention is not limited to planar weighing devices, as described in U.S. Pat. No. 4,979,580. Embodiments of the invention can be applied to any load cell or load cell system where accurate equalization of sensitivity between individual gages is required.

What is claimed is:

1. A strain gage bridge circuit in a load cell, comprising:
    four arms, including strain gages, connected to form first and second diagonals, one of said diagonals being connected to a power supply source and the other of said diagonals providing an output signal representing the sum of the signals from said strain gages;
    first and second resistors connected in series across said first diagonal of said bridge circuit; and
    a third resistor connected between the junction point of said series connected first and second resistors and one end of said second diagonal of said bridge circuit.

2. A strain gage bridge circuit according to claim 1, further comprising:
    fourth and fifth resistors connected in series across said second diagonal of said bridge circuit; and
    a sixth resistor connected between the junction point of said series connected fourth and fifth resistors and one end of said first diagonal of said bridge circuit.

3. A strain gage bridge circuit according to claim 1, wherein said first and second resistors have predetermined and substantially equal resistance values.

4. A strain gage bridge circuit according to claim 2, wherein said fourth and fifth resistors have predetermined and substantially equal resistance values.

5. A method for equalizing the sensitivity of opposing half-bridges in a strain gage bridge circuit having four arms forming a first and a second bridge diagonal and pairs of half-bridges arranged symmetrically about each of said first and second bridge diagonal, the method comprising:
    connecting first and second resistors in series across the first diagonal in the bridge circuit;
    determining which of the two half-bridges arranged symmetrically about the first bridge diagonal has the highest sensitivity;
    connecting a third resistor between the junction point of the first and second resistors and the center tap of the half-bridge having the highest sensitivity; and
    adjusting the resistance of the third resistor to equalize the sensitivity of the two half bridges about the first bridge diagonal.

6. A method for equalizing the sensitivity of opposing half-bridges in a strain gage bridge circuit according to claim 5, further comprising the act of selecting the ratio of resistance of the first and the second resistor to equal the ratio of the resistance of the two arms constituting the half-bridge to be equalized.

* * * * *